June 24, 1958   G. A. WALTERS ET AL   2,840,817
QUADRANT INFORMATION MECHANISM FOR RADAR SYSTEM
Filed Aug. 27, 1953   5 Sheets-Sheet 1

INVENTORS
GLENN A. WALTERS
ARTHUR P. NOTTHOFF, JR.
BY
Mellin and Hanscom
ATTORNEYS June 24, 1958     G. A. WALTERS ET AL     2,840,817

QUADRANT INFORMATION MECHANISM FOR RADAR SYSTEM

Filed Aug. 27, 1953     5 Sheets-Sheet 2

INVENTORS
GLENN A. WALTERS
ARTHUR P. NOTTHOFF, JR.
BY
Mellin and Hanscom
ATTORNEYS June 24, 1958   G. A. WALTERS ET AL   2,840,817
QUADRANT INFORMATION MECHANISM FOR RADAR SYSTEM
Filed Aug. 27, 1953   5 Sheets-Sheet 3

INVENTORS
GLENN A. WALTERS
ARTHUR D. NOTTHOFF, JR.
BY
*Mellin and Hanscom*
ATTORNEYS

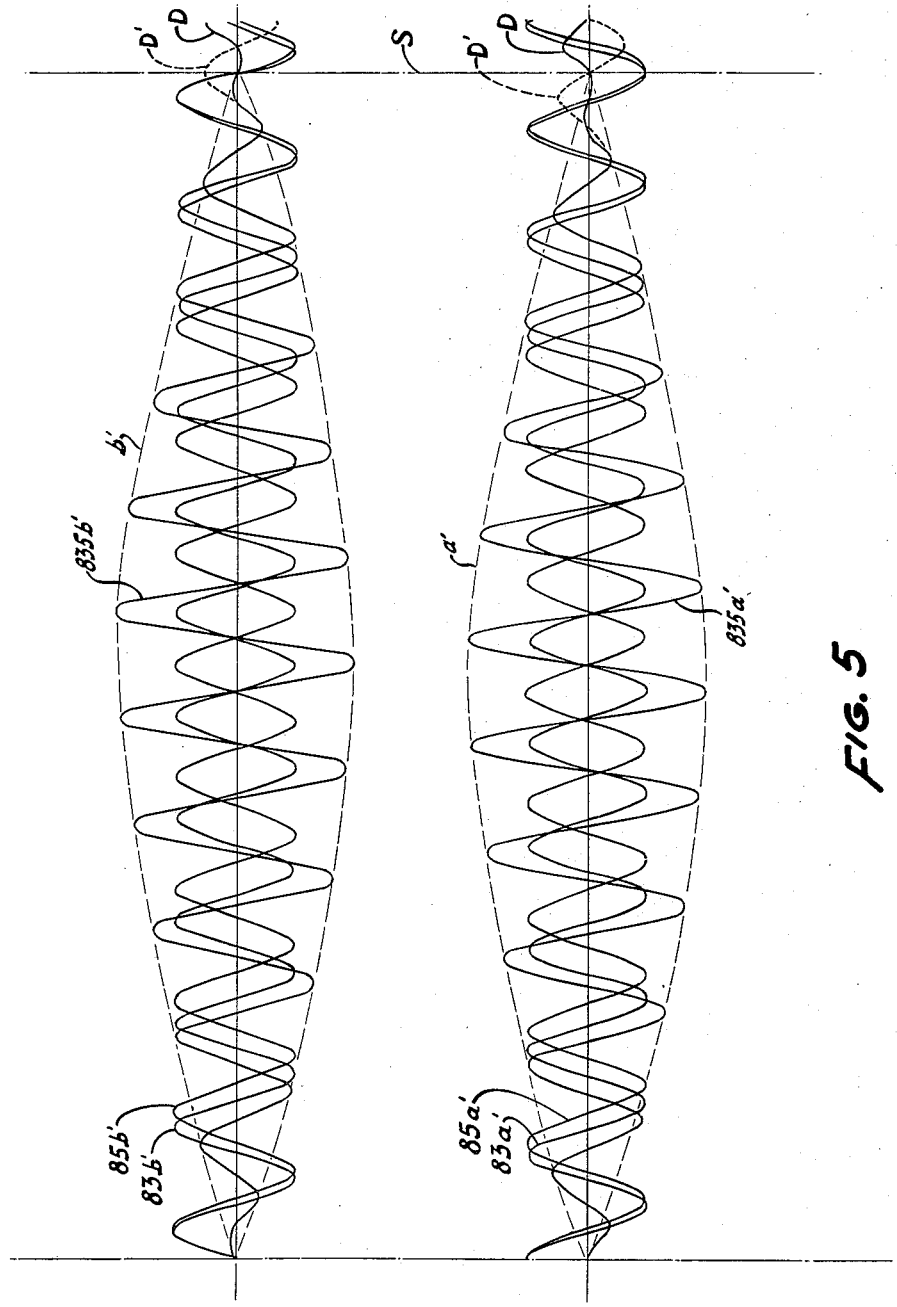

June 24, 1958   G. A. WALTERS ET AL   2,840,817
QUADRANT INFORMATION MECHANISM FOR RADAR SYSTEM
Filed Aug. 27, 1953   5 Sheets—Sheet 5

INVENTORS
GLENN A WALTERS
ARTHUR P. NOTTHOFF, JR.
BY
Mellin and Hanscom
ATTORNEYS

2,840,817

QUADRANT INFORMATION MECHANISM FOR RADAR SYSTEM

Glenn A. Walters, Palo Alto, and Arthur P. Notthoff, Jr., San Francisco, Calif., assignors, by mesne assignments, to Textron Inc., Providence, R. I., a corporation of Rhode Island Application August 27, 1953, Serial No. 376,876

4 Claims. (Cl. 343—760)

This invention relates to a radar system and particularly to a mechanism for moving the radiating unit of the radar system in accordance with a predetermined scan pattern and for indicating or signaling the position of the unit at the time contact is made with an exterior object.

The mechanism of the present invention is ideally suited for installation on aircraft and the mechanism will so be described; however, the invention is not so limited and may be otherwise variously utilized.

During flight it would be of considerable value to flying personnel to be appraised of the approximate location of other aircraft in the general vicinity, not only to enable evasive or pursuit action, but to avoid collision, etc. It is a primary object of the present invention to provide a mechanism, forming a part of a radar system, for giving the approximate location of adjacent aircraft, and particularly to give the quadrant location of such aircraft with reference to a plane disposed normal to the axis of rotation of the radar reflector and divided into quadrants by lines intersecting at said axis.

A further object of the present invention is to provide a mechanism such as above described designed to not only give quadrant information, but also to indicate the angular position of the aircraft within its quadrant, both as to azimuth and elevation angles.

Various other objects of the present invention will be apparent from the following description taken in connection with the accompanying drawings, wherein:

Fig. 5 is a diagram of wave forms showing how the spiral on the face of the cathode ray tube is created and how crossover is accounted for.

General description

Figure 1:
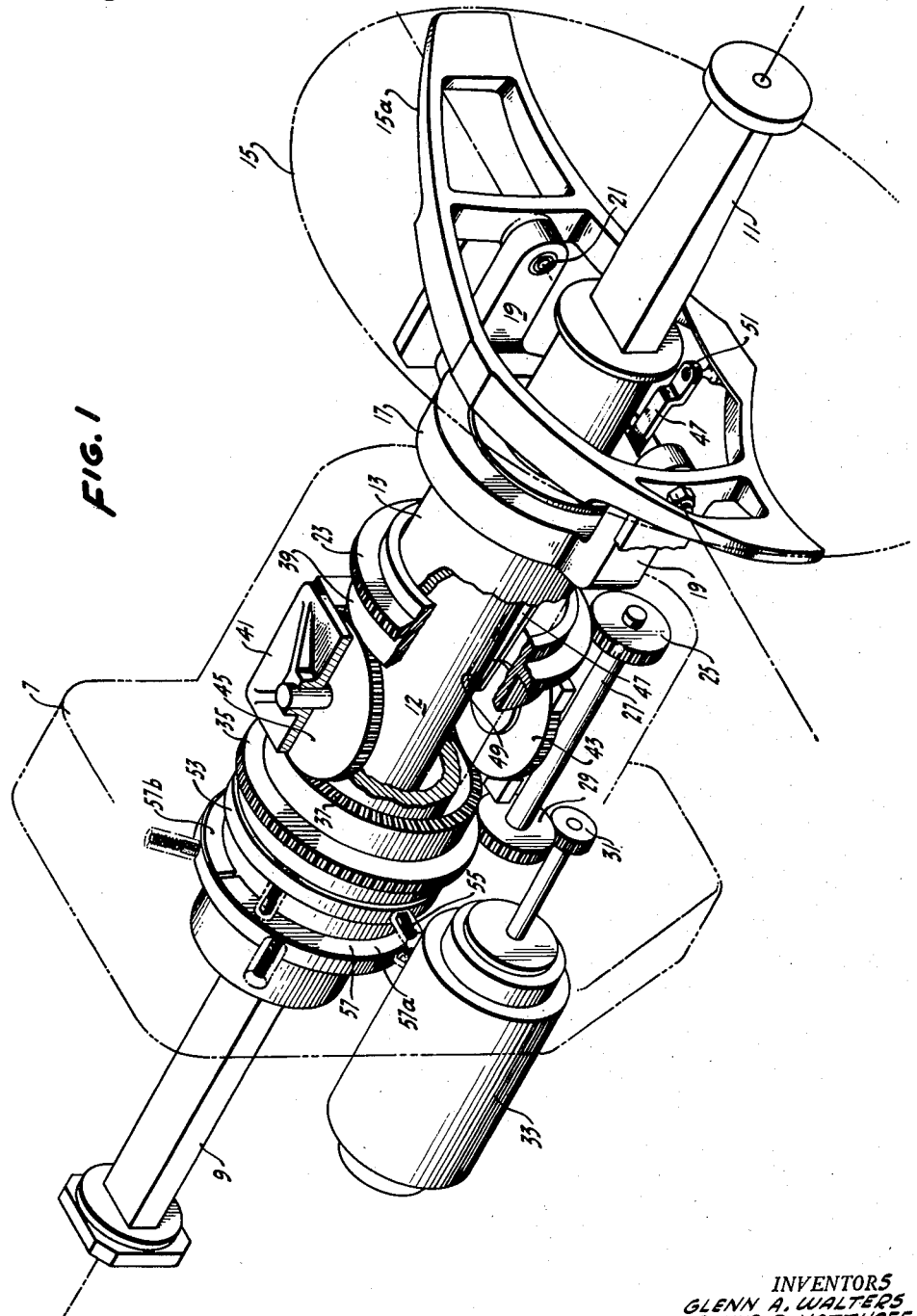
Fig. 1 is a perspective somewhat schematic view of a mechanism embodying the concepts of the present invention, parts being broken away for convenience in illustration.

The invention may be most readily understood by assuming that an aircraft carries a radar system including a forwardly facing (it could be as well rearwardly facing) reflector, such as a dish, mounted on the aircraft for rapid rotation about the longitudinal axis of the aircraft or an axis parallel thereto. Now, assume that as the dish is rapidly rotated, it is slowly oscillated about an axis normal to the axis of rotation of the reflector (and extending through the vertex of the reflector) first to the left of the axis of rotation of the reflector and then back to said axis and then to the right across the axis of rotation of the reflector and then back to said axis. It is evident that the beam of radio frequency energy reflected by the reflector will scan along progressively increasing approximately conical paths as the dish is pivoted to the left away from its axis of rotation, and then progressively decreasing approximately conical paths as the dish pivots toward said axis, and then progressively increasing approximately conical paths as the dish pivots away from said axis in the opposite direction, and then progressively decreasing approximately conical paths as the dish is pivoted back toward said axis.

Viewing the beam as it would scan a vertical plane disposed just forwardly of the dish and normal to the axis of rotation of the dish, an increasing spiral path would be produced as the dish pivoted away from its axis of rotation and a decreasing spiral path as the dish pivoted back toward said axis, in each direction of swing of the dish from its axis of rotation.

Now, further assuming that the distance between two adjacent portions of the spiral path is less than the beam width reflected by the dish, it is apparent that the entire space within the range of the operating movement of the dish is scanned so that adjacent aircraft within the range of operation of the reflector will be readily detected.

As beforementioned, the primary object of the present invention is to provide a mechanism giving quadrant information. That is, assume that the aforementioned vertical plane is divided into quadrants by lines intersecting at right angles at the axis of rotation of the reflector, wherein one line is vertical and the other line is horizontal, and assume a clock face is represented on the vertical plane with twelve o'clock and six o'clock disposed along the vertical line. The primary object is to inform the personnel of aircraft of the presence of adjacent aircraft and particularly in which quadrant the aircraft is located. For instance, is the aircraft located in the twelve o'clock to three o'clock quadrant, the three o'clock to six o'clock quadrant, the six o'clock to nine o'clock quadrant or the nine o'clock to twelve o'clock quadrant? Incidental to the above discussion, it is pointed out that the o'clock representations taken in a vertical plane are obviously different from the usual o'clock designations given aircraft personnel, the latter designations being taken in a horizontal plane.

Figure 2:
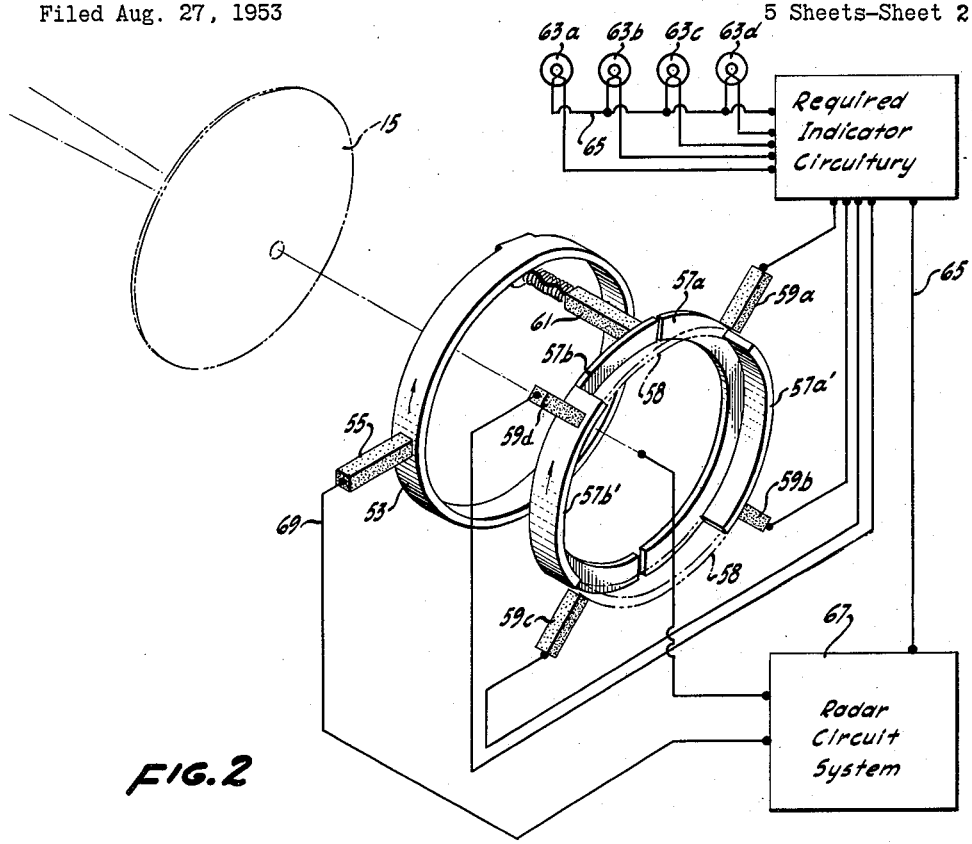
Fig. 2 is a schematic view showing the circuit arrangement for the mechanism disclosed in Fig. 1, Fig. 2 being taken looking at the rear of the reflector.

In Figs. 1 and 2 a mechanism is disclosed including a novel switching arrangement providing four circuits, one for each quadrant and each of which has a separate signaling means, which circuits are arranged to transmit to their signaling means an electric pulse when contact is made within the quadrant operatively associated with the particular circuit in question. When the beam is scanning one quadrant, say the twelve to three o'clock quadrant, one circuit is conditioned by the switching means to transmit a pulse of electrical energy to its signaling means, providing contact is made as the beam is scanning that quadrant, and when the beam is scanning the next quadrant, say the three to six o'clock quadrant, the second circuit is conditioned by the switching means to transmit an electric pulse to its signaling means, etc. Instead of a pulse being transmitted to the signaling means when contact is made, a continuous supply of energy may be provided, such as by a suitable relay to hold the signaling means energized so long as contact with the detected aircraft is made in the particular quadrant within which the aircraft is located.

In order that the following specific explanation be entirely clear, a problem encountered in such a switching arrangement must be pointed out. Suppose an axial line is marked on the shaft which is rotated to rotatably drive the reflector. It might be supposed that by noting the position of this line, the quadrant being scanned by the beam would be determined. This is not so because the reflector crosses over its axis of rotation during its oscillating movement. When the reflector is pivoted from one position on one side of the axis of rotation to a position on the opposite side of the axis of rotation the reflector may have been scanning the twelve to three o'clock quadrant, but when pivoted as above mentioned, the reflector will now scan the diagonally opposite quadrant, i. e., the six to the nine o'clock quadrant. It is apparent, therefore, that a shift in the quadrant being scanned of 180° is effected when the dish is oscillated or pivoted across its axis of rotation and, therefore, the line marked on the shaft does not correctly indicate the quadrant being scanned, but would indicate the diagonally opposite quadrant, and therefore would be 180° incorrect.

Figure 7:
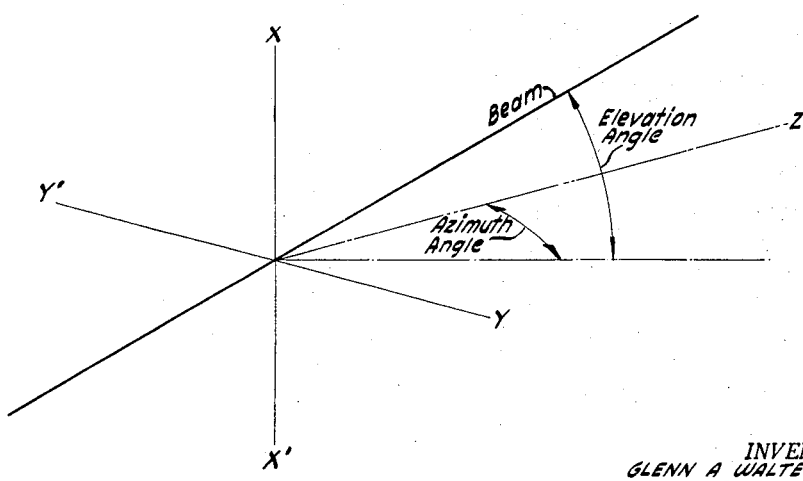
Fig. 7 is a diagram showing azimuth and elevation angles with reference to space scanned by the radiating unit of the radar system of the present invention.

Referring to Fig. 7, it is apparent that there are X—X' lines, Y—Y' lines, but only a Z line, there being no Z' line. The space rearwardly of the vertical plane X, X', Y, Y' (i. e. toward Z') would be scanned if the operating movement of the reflector were 180°, i. e., 90° from the axis of rotation (which is the Z axis) in one direction and then 90° from the axis of rotation in the opposite direction, and of course back. Although a 180° scan movement will be conventionally utilized, the specific embodiment of the invention disclosed scans only approximately 50°, i. e., 25° on one side of the axis of rotation and 25° toward the opposite side and back, the difference being made for the purpose of simplifying the drawings for convenience in illustration. With such a limited swinging movement, the feed guide can be maintained stationary, otherwise a rotary joint would be necessarily provided so as to enable the feed guide to move with the reflector.

Specific description

Referring to Fig. 1, there is disclosed, somewhat schematically for convenience in illustration, a mechanism including a frame 7, indicated in phantom lines, supporting a waveguide member 9, having secured to its righthand end a feed guide 11, including a conventional radiating horn. Coaxially disposed about member 9 and supported by frame 7 is a fixed sleeve 12 on which is rotatably mounted a coaxially disposed rotary sleeve 13, which carries a radio frequency energy reflector 15, shown in phantom lines and assuming the form of a dish. Reflector 15 is mounted on sleeve 13 by a collar 17 fixed to the sleeve and having arms 19 pivoted at 21 to the frame 15a of the reflector. The reflector is oscillated about pivots 21 in a manner to be presently explained.

Rotatably mounted on sleeve 13 is a ring gear 23 driven by a pinion 25 fixed to a countershaft 27, the latter being suitably rotatably mounted (in a manner not shown) on frame 7 for rotation about a bodily stationary axis parallel to the axis of rotation of the dish 15. Also mounted on countershaft 27 is a spur gear 29 driven by a pinion 31, the latter being fixed to the motor shaft of a motor 33. Rotatably mounted on sleeve 13 is a second ring gear 35 driven by spur gear 29, the ratio of gear 29 to the ring gear 35 being slightly greater than the ratio of spur gear 25 to gear 23, so that ring gear 35 is driven at slightly greater speed than ring gear 23. Fixed to or integral with ring gear 35 is a crown gear 37, and integral with or fixed to ring gear 23 is a crown gear 39. Crown gears 37 and 39 have the same number of teeth. Driven by these crown gears is a differential box 41 fixed to sleeve 13 and rotatably carrying diametrically disposed spur gears 43 and 45, which mutually engage crown gears 37 and 39. Assuming that the crown gears 37 and 39 bear a gear ratio of 1:1 to spur gears 43 and 45, it is evident that if ring gear 35 is driven at spin speed plus nod speed and ring gear 23 is driven at spin speed minus nod speed the gears 43 and 45 will rotate at the differential speed between the rates of rotation of the crown gears 37 and 39, namely nod speed and the differential box 41, hence the sleeve 13 and dish 15 attached thereto will rotate at the average of the speeds of the two ring gears 23 and 35, namely, spin speed.

Connecting differential gear 43 to the dish frame 15a is a crank 47 (which may be a Scotch yoke) the crank being pivoted at 49 to differential gear 43 eccentric to the axis of rotation thereof, and to the dish frame 15a at 51. When the dish is at "dead center," i. e., disposed to reflect along its axis of rotation, as it is in Fig. 1, pivot 49 is disposed at the position shown, namely at 90° from a position in longitudinal alignment with pivot 51. Therefore, during rotation of gear 43, dish 15 will be rotated first at a certain increment of movement in one direction off the axis of rotation of the dish and back to the axis of rotation, and then the same increment of movement in the opposite direction and then again back to the axis of rotation.

Now, referring to Fig. 1, there is fixed to ring gear 35 an unbroken contactor ring 53 (see Fig. 2 also) to be thereby driven at spin plus nod speed of the dish. That is, since ring gear 35 is driven at a higher rate of speed than ring gear 23 and since ring gear 35 is responsible for the oscillating or nodding movement of dish 15, it is apparent that ring 53 will be driven at the spin speed of the dish plus the effective speed of rotation of the dish about its axis of oscillation. In other words, during a selected period, the number of revolutions traveled by ring gear 35 will exceed that of ring gear 23 by an amount equal to twice the number of cycles of oscillating movement of the dish. There is a brush 55 arranged in engagement with ring 53, further mention to be made of this brush hereinafter.

Fixed to sleeve 13 is a split ring 57 including two arcuate segments 57a and 57b, each extending circumferentially slightly less than 180° and being separated and preferably insulated from one another at their adjacent ends. Arcuate segments 57a and 57b include symmetrically disposed 90° arcuate portions 57a' and 57b', respectively. Disposed circumferentially between portions 57a' and 57b' are arcuate insulating pieces 58. Arranged about and adapted to engage portions 57a' and 57b' are four equally spaced brushes 59a, 59b, 59c and 59d. Between rings 53 and 57 is a single brush 61 providing electrical contact between the rings.

Referring particularly to Fig. 2, there are four indicating or signaling means, 63a, 63b, 63c and 63d, conventionally shown as lamps but which may assume any conventional form, such as whistles, etc. Brushes 59a, 59b, 59c and 59d are connected respectively to signaling means 63a, 63b, 63c and 63d. A common lead 65 connects all the lamps to a radar circuit system 67, and a lead 69 connects brush 55 to said circuit system.

The operation of the mechanism is as follows: When contact with an adjacent aircraft is made, a pulse will be transmitted through leads 65 and 69 to energize one of the lamps 63a to 63d, for each revolution of the dish, and hence a flashing light will be produced. As an alternate construction a suitable relay can be provided for holding the light energized. Which lamp will be energized will be determined from the following explanation. Only one arcuate segment 57a or 57b will be in electrical contact with ring 53 at any time, and when segment 57a is in electrical contact with ring 53, only 90° portion 57a' is capable of causing one of the lamps 63a to 63d to be energized.

The operation of the dish is most easily understood by assuming that the dish is swung to face a direction at an angle to the axis of rotation of the dish and fixed in such position, and that rings 53 and 57 move in unison. Brush 59a is the twelve to three o'clock brush, brush 59b the three to six o'clock brush, brush 59c the six to nine o'clock brush, and brush 59d the nine to twelve o'clock brush. The dish will be so mounted and the segments 57a and 57b so arranged relative to the dish that when the leading edge of portion 57a' contacts brush 59a, the dish is being rotatably moved so that the beam sweeps into the twelve o'clock to three o'clock quadrant. When the trailing edge of portion 57a' leaves brush 59a, the dish has just finished scanning the twelve to three o'clock quadrant, and at this time the leading portion of 57a' is just engaging brush 59b, so that as the dish scans the three o'clock to six o'clock quadrant, portion 57a' will be in engagement with brush 59b. If contact is made when the dish is say, scanning the three to six o'clock quadrant, an electrical pulse will be transmitted through portion 57a' and brush 59b to lamp 63b to indicate that an aircraft within the three o'clock to six o'clock quadrant has been detected.

However, dish 15 is not fixed in the angular position specified, but will be pivoted or oscillated across the spin axis and, therefore, if rings 53 and 57 moved in unison, the diagonally opposite quadrant from that being scanned would be indicated when contact was made with an adjacent aircraft. Because of the difference in speed between rings 53 and 57, brush 61 slowly advances around segments 57a and 57b, and just as dish 15 is pivoted across its spin axis, brush 61 moves from segment 57a onto segment 57b. Therefore, there is a reversal in the arrangement of the lamps to be energized with relation to rotation of ring 57, because it will now be portions 57b' which will be responsible for transmitting an electrical pulse to lamps 63a, 63b, 63c and 63d. Therefore, there is accomplished a 180° shift of the signaling circuit system in coordination with the pivoting movement of the dish across its axis of spin.

Figure 3:
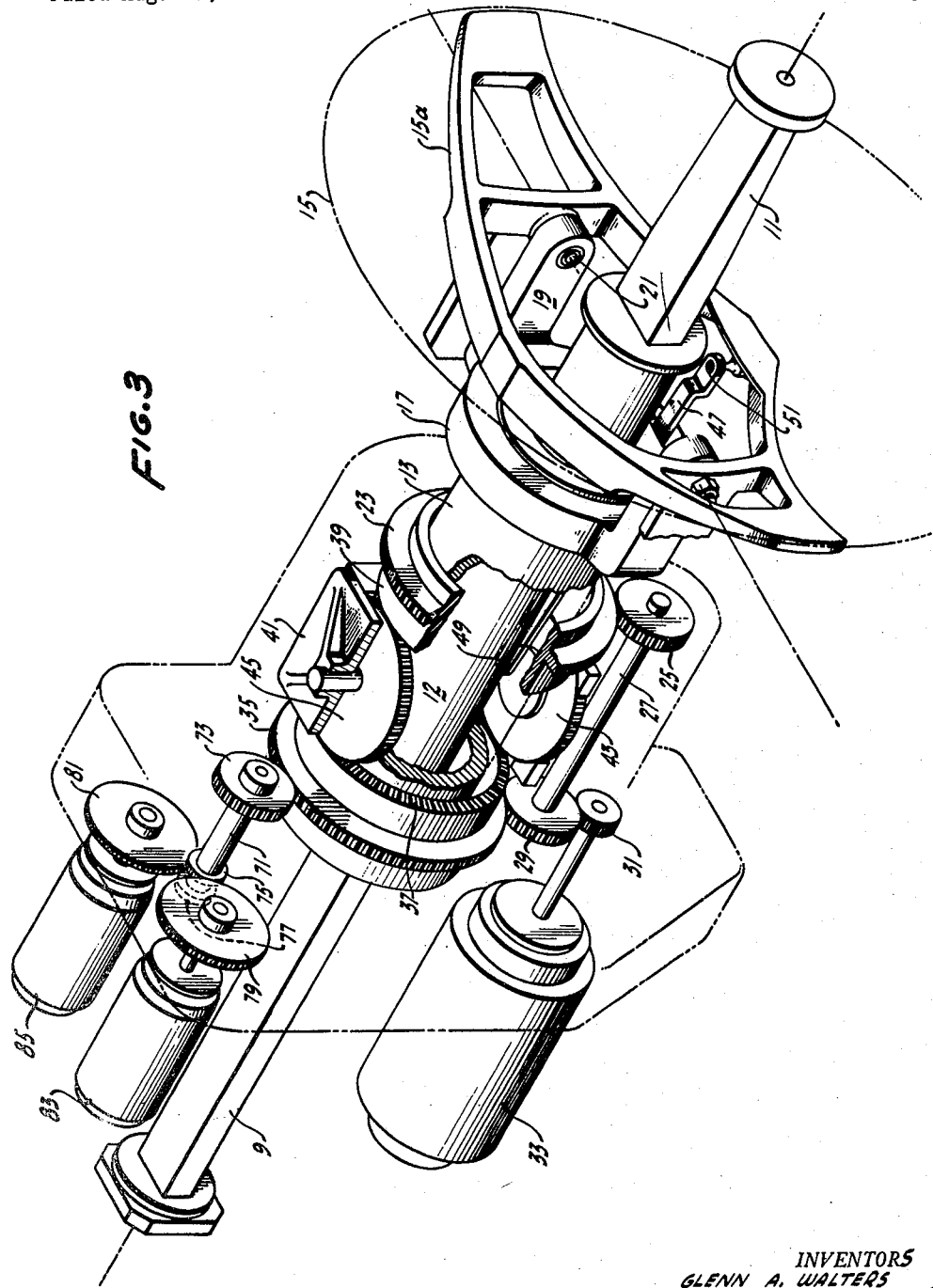
Fig. 3 is a perspective somewhat schematic view of another mechanism embodying the concepts of the present invention, with parts broken away for convenience in illustration.

In order to furnish, in addition to quadrant information, the angular location of the adjacent aircraft, i. e., its azimuth and elevation angles, another arrangement is provided and is shown in Figs. 3 through 7. The major portion of the mechanism of Fig. 3 is identical to that of Fig. 1, as indicated by similar reference numerals, with the following exceptions. There are no slip rings 53 and 57, nor brushes 55, 59 and 61, nor signaling means and associated circuits. However, added to the mechanism is a countershaft 71 rotatably supported by frame 7 and driven by ring gear 35 by means of a spur gear 73 fixed to one end of said countershaft. Fixed to the opposite end of countershaft 71 are two spur gears 75 and 77, driving spur gears 79 and 81, respectively, which are fixed to the shafts of generators 83 and 85, respectively. The diameters of gears 35, 73, 75 and 79 are such that the shaft of generator 83 and ring gear 35 rotate at the same speed, namely at spin speed plus nod (oscillating) speed. However, the diameters of gears 35, 73, 77 and 81 are such that the shaft of generator 85 is driven at spin speed minus nod speed. Therefore, generator 83 can be conveniently referred to as the sum generator, whereas the generator 85 can be referred to as the difference generator.

Figure 4:
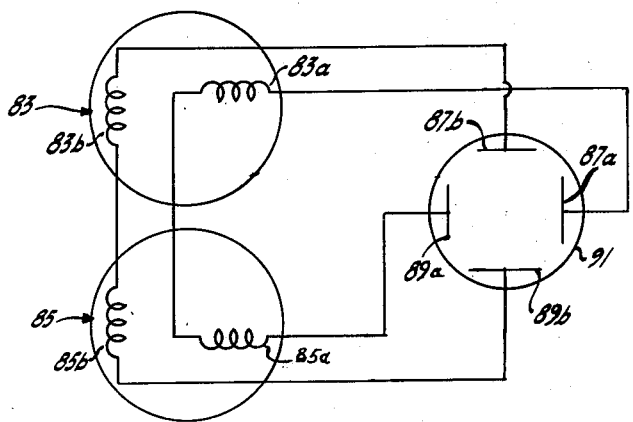
Fig. 4 is a schematic wiring diagram of the circuit arrangement for the mechanism of Fig. 3.

Now, referring to Fig. 4, it is apparent that each generator has two windings 83a and 83b for generator 83, and 85a and 85b for generator 85. The windings of each generator are disposed 90° in space and time with respect to one another. Windings 83a and 85a are connected together and to plates 87a and 89a, and windings 83b and 85b are connected together and respectively to plates 87b and 89b, said plates being the beam deflecting plates of a cathode ray tube 91, the face of which is disclosed in Fig. 6.

Referring to Fig. 5, the upper diagram shows voltages 83b' and 85b' from windings 83b and 85b, whereas the lower diagram shows the voltages 83a' and 85a' from windings 83a and 85a. The resultant voltage wave form produced by combining voltages 83b' and 85b' is indicated by the reference numeral 835b' and the resultant voltage wave form produced by combining voltages 83a' and 85a' is indicated by the reference numeral 835a'. It is apparent by comparing the upper and lower portions of Fig. 5 that voltages 83a' and 85a' lead voltages 83b' and 85b', respectively, by 90° in time. It is evident from Fig. 5 that the envelopes of both voltages 835a' and 835b' progressively rise and fall in magnitude as indicated by the envelope lines a' and b'.

When two voltages of the same frequency are disposed in 90° space-time relationship and are properly connected to the beam deflecting plates of a cathode ray tube, a rotary electrostatic field will be set up to cause the beam to describe a circular path on the face of the tube.

Now, if the envelopes of the two voltages rise and fall, as do the voltage envelopes a' and b' of the resultant voltages 835a' and 835b' of Fig. 5, the beam will describe a spiral path extending from the center of the tube outwardly and then back again toward the center of the tube. The two voltages making up each of the resultant voltages 835a' and 835b' have frequencies equal, respectively, to spin plus nod speed and spin minus nod speed and, therefore, each of the resultant waveforms has the appearance of being the average of these two frequencies (spin rate) modulated at a rate which is half their difference (nod rate). It is evident that with proper phase relationship between the mechanical motions of the reflector and voltages 835a' and 835b', the motion of the cathode-ray beam is directly related to the reflector movement. Furthermore, not only does the spiral beam rotate in unison with the reflector, but is directed in the same direction, i. e., the same azimuth and elevation angles, if such angles are considered projected on the vertical plane of the face of the tube. Therefore, when contact with an adjacent aircraft is made, the beam is momentarily intensified to provide a bright spot on the face of the cathode ray tube. This spot indicates not only the quadrant in which the adjacent aircraft is located, but also its azimuth and elevation angles. The azimuth angle is proportional to the distance the spot is spaced from the Y—Y' axis of the tube, whereas the elevation angle is proportional to the distance the spot is spaced from the X—X' axis of the tube. Therefore, by viewing the face of the cathode ray tube, not only quadrant location but also the azimuth and elevation angles of the adjacent aircraft can be determined. It is contemplated that the face of the tube will be suitably scaled to indicate azimuth and elevation angles.

Figure 6:
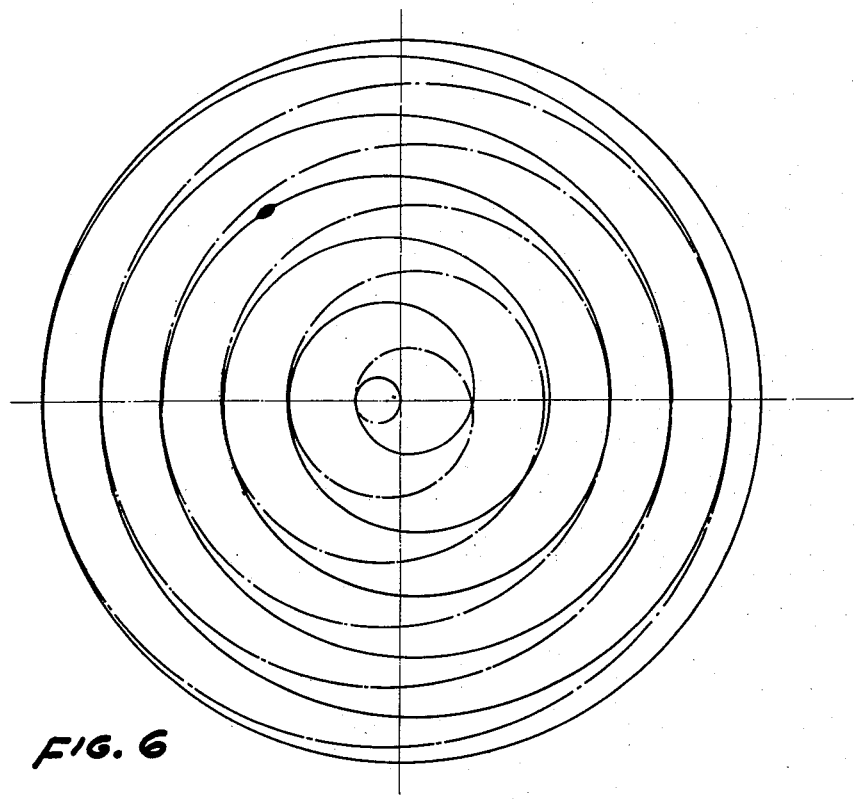
Fig. 6 is a view looking at the face of the cathode ray tube.

As yet, no explanation has been given to account for correct quadrant designation when the reflector is oscillated or pivoted across its axis of rotation. Referring to Fig. 5, it is apparent that when two different frequencies are combined that the lower frequency must overtake the higher frequency, and hence the resultant voltage wave form skips a half cycle, that is 180°, at periodic intervals. Such a condition exists at points S in both the upper and lower diagrams in Fig. 5. It is evident by an examination of the diagrams that wave portions D' in dotted lines, which would be thought to be the natural continuation of wave forms 835a' and 835b', are 180° out of phase with solid line wave form portions D. This action means that the beam path on the face of the cathode ray tube will switch quadrants 180° when coming back to its zero position. Reference to Fig. 6, shows this action. The beam path instead of traveling into the upper righthand quadrant when coming back to zero (along the solid line), moves instead into the lower lefthand quadrant, the six to nine o'clock quadrant and, therefore, correctly indicates the quadrant toward which the reflector is directed. Since the rise and fall of the envelopes of the resultant voltages 835a' and 835b' is in unison with in and out pivoting movement of the reflector, the 180° switching of quadrants occurs just as the reflector switches across its axis of rotation.

By the present invention two mechanisms have been provided, both indicating the quadrant being scanned by the reflector at the time contact is made, one mechanism indicating in addition the azimuth and elevation angles of the adjacent aircraft. It is contemplated that the beam intensity of the cathode ray tube may be such that the spiral path is not visible on the face of the tube, but when contact is made, the beam will be intensified to place a bright spot on said face, which will have definite significance because of the scale lines provided.

While we have shown the preferred form of our invention, it is to be understood that various changes may be made in its construction by those skilled in the art without departing from the spirit of the invention as defined in the appended claims.

Having thus described our invention, what we claim and desire to secure by Letters Patent is:

1. A device of the class described, comprising a wave energy reflector, means for rotating the reflector about one axis while oscillating the reflector about another axis normal to the axis of rotation in a manner such that the reflector crosses over said axis of rotation during operation, means for indicating, with reference to a plane normal to the axis of rotation of the reflector and divided into quadrants by lines intersecting at the axis of rotation of the reflector, that quadrant toward which the reflector is directed when contact is made by the wave energy beam, the second-named means including diametrically opposed conducting elements driven at the speed of rotation of said reflector, four equally spaced brushes arranged to be consecutively engaged by the conducting elements, a signaling means for each brush, and means associated with the signaling means for establishing electrical contact with one element when the member is pivoted to one side of its axis of rotation and to establish electrical contact with the other element when the reflector is pivoted to the opposite side of its axis of rotation, whereby the correct quadrant toward which the reflector is directed is indicated despite its crossing over its axis of rotation.

2. A device of the class described, comprising a wave energy reflector, means for rotating the reflector about one axis while oscillating the reflector about another axis normal to the axis of rotation in a manner such that the reflector crosses over said axis of rotation during operation, means for indicating, with reference to a plane normal to the axis of rotation of the reflector and divided into quadrants by lines intersecting at the axis of rotation of the reflector, that quadrant toward which the reflector is directed when contact is made by the wave energy beam, the second-named means including diametrically opposed conducting elements driven at the speed of rotation of said reflector, four equally spaced brushes arranged to be consecutively engaged by the conducting elements, a signaling means for each brush, and means associated with the signaling means for establishing electrical contact with one element when the member is pivoted to one side of its axis of rotation and to establish electrical contact with the other element when the reflector is pivoted to the opposite side of its axis of rotation, whereby the correct quadrant toward which the reflector is directed is indicated despite its crossing over its axis of rotation, the last-named means including a circular conducting element rotatably driven at a speed differing from the rotary speed of the reflector by an amount equal to the effective rotary speed of the oscillating reflector, and having a conductor disposed to engage the first-named conducting elements in consecutive fashion during relative rotation between the circular conducting element and the first-named conducting elements.

3. A device of the class described, comprising a wave energy reflector, means for rotating the reflector about one axis while oscillating the reflector about another axis normal to the axis of rotation in a manner such that the reflector crosses over said axis of rotation during operation, means for indicating, with reference to a plane normal to the axis of rotation of the reflector and divided into quadrants by lines intersecting at the axis of rotation of the reflector, that quadrant toward which the reflector is directed when contact is made by the wave energy beam, the second-named means including diametrically opposed conducting elements driven at the speed of rotation of said reflector, four equally spaced brushes arranged to be consecutively engaged by the conducting elements, a signaling means for each brush, and means associated with the signaling means for establishing electrical contact with one element when the member is pivoted to one side of its axis of rotation and to establish electrical contact with the other element when the reflector is pivoted to the opposite side of its axis of rotation, whereby the correct quadrant toward which the reflector is directed is indicated despite its crossing over its axis of rotation, each of the first-named conducting elements including an approximately 180° arcuate conducting portion arranged to travel a path offset from the brushes, and a symmetrically disposed approximately 90° portion arranged to travel a path to engage the brushes.

4. A device of the class described, comprising a wave energy reflector, means for rotating the reflector about one axis while oscillating the reflector about another axis normal to the axis of rotation in a manner such that the reflector crosses over said axis of rotation during operation, means for indicating, with reference to a plane normal to the axis of rotation of the reflector and divided into quadrants by lines intersecting at the axis of rotation of the reflector, that quadrant toward which the reflector is directed when contact is made by the wave energy beam, the second-named means including diametrically opposed conducting elements driven at the speed of rotation of said reflector, four equally spaced brushes arranged to be consecutively engaged by the conducting elements, a signaling means for each brush, and means associated with the signaling means for establishing electrical contact with one element when the member is pivoted to one side of its axis of rotation and to establish electrical contact with the other element when the reflector is pivoted to the opposite side of its axis of rotation, whereby the correct quadrant toward which the reflector is directed is indicated despite its crossing over its axis of rotation, the last-named means including a circular conducting element rotatably driven at a speed differing from the rotary speed of the reflector by an amount equal to the effective rotary speed of the oscillating reflector, and having a conductor disposed to engage the first-named conducting elements in consecutive fashion during relative rotation between the circular conducting element and the first-named conducting elements, each of the first-named conducting elements including an approximately 180° arcuate conducting portion arranged to travel a path offset from the brushes, and a symmetrically disposed approximately 90° portion arranged to travel a path to engage the brushes.

References Cited in the file of this patent

UNITED STATES PATENTS

| | | |
|---|---|---|
| 2,437,275 | Skene et al. | Mar. 9, 1948 |
| 2,526,314 | Alexanderson | Oct. 17, 1950 |
| 2,590,540 | Jackson | Mar. 25, 1952 |